United States Patent [19]
Allcock et al.

[11] Patent Number: 5,747,604
[45] Date of Patent: May 5, 1998

[54] POLYPHOSPHAZENES WITH UNSATURATED SIDE GROUPS USEFUL AS REACTION INTERMEDIATES, CROSS-LINKABLE POLYMERS, AND AS COMPONENTS OF INTERPENETRATING POLYMER NETWORKS

[75] Inventors: Harry R. Allcock, State College, Pa.; Karyn Visscher, Voorhees, N.J.; Young Baek Kim, Daejon, Rep. of Korea

[73] Assignee: The Penn State Research Foundation, University Park, Pa.

[21] Appl. No.: 589,747

[22] Filed: Apr. 1, 1996

[51] Int. Cl.$^6$ .............................. C08L 85/02; C08G 79/02
[52] U.S. Cl. .......................... 525/417; 525/186; 525/188; 525/479; 525/538; 525/903; 528/399
[58] Field of Search ............................. 525/186, 188, 525/417, 479, 538, 903; 528/399

[56] References Cited

U.S. PATENT DOCUMENTS

| | | | |
|---|---|---|---|
| 4,495,174 | 1/1985 | Allcock et al. | 424/78 |
| 4,734,471 | 3/1988 | Chang | 528/399 |
| 4,806,322 | 2/1989 | Hergenrother et al. | 423/300 |
| 4,959,442 | 9/1990 | Ohkawa | 528/399 |
| 5,075,453 | 12/1991 | Ueyama et al. | 548/413 |
| 5,101,003 | 3/1992 | Allcock et al. | 528/167 |
| 5,104,947 | 4/1992 | Schacht et al. | 525/538 |
| 5,138,008 | 8/1992 | Montague et al. | 528/21 |
| 5,250,626 | 10/1993 | Landry et al. | 525/188 |
| 5,260,103 | 11/1993 | Gleria et al. | 427/520 |
| 5,382,644 | 1/1995 | Montague et al. | 528/30 |
| 5,403,909 | 4/1995 | Rubinsztajn | 528/20 |
| 5,414,025 | 5/1995 | Allcock et al. | 522/46 |
| 5,424,385 | 6/1995 | Hager et al. | 528/28 |

OTHER PUBLICATIONS

Allcock, H. R., Cross–Linking Reactions for the Conversion of Polyphosphazenes into Useful Materials, *Chem. Mater.*, vol. 6, pp. 1476–1491, 1994.

Allcock, H.R. et al, Synthesis and Properties of Polyphosphazene Interpenetrating Polymer Networks, *Macromolecules*, vol. 23, pp. 4885–4886, 1990.

Allcock, et al., Organosilylphosphazene Oligomers and Polymers: Synthesis via (Lithioaryloxy) Phosphazenes, *Macromolecules*, vol. 22, pp. 3571–3578, 1989.

Wisian–Neilson, P. et al., Poly(methylphenylphosphazene)–graft poly(dimethylsiloxane), *Macromolecules*, vol. 22, pp. 2026–2028, 1989.

Medici, A. et al., Functionalization of Phosphazenes. 1. Synthesis of Phosphazene Materials Containing Hydroxyl Groups, *Macromolecules* vol. 25, pp. 2569–2574, 1992.

Allcock, H.R. et al., Polyphosphazene–Organic Polymer Interpenetrating Polymer Networks, *Chem. Mater.*, vol. 4, pp. 1188–1192, 1992.

Allcock. H.R. et al., Synthesis, Characterization, and Modification of Poly(organophosphazenes) with Both 2,2,2–Trifluoroethoxy and Phenoxy Side Groups, *Macromolecules*, vol. 27, pp. 3933–3942, 1994.

Allcock, H.R., Rational Design and Synthesis of New Polymeric Materials, *Science*, vol. 255, pp. 1106–1112.

Tate, D. P., Polyphosphazene Elastomers, *J. Polymer Sci.*: Symposium No. 48, pp. 33–45, 1974.

Allcock, H.R., Inorganic Macromolecules, *C&EN*, pp. 22–36, 1985.

*Primary Examiner*—David Buttner
*Attorney, Agent, or Firm*—Thomas J. Monahan

[57] ABSTRACT

A number of new poly(organophosphazenes) have been synthesized which bear 2-butenoxy or 4-allyloxyphenylphenoxy side groups. Co-substituent groups included trifluoroethoxy, phenoxy, or benzyloxyphenoxy groups. Species with 4-allyloxyphenylphenoxy units underwent Si—H coupling to linear silanes or siloxanes to extend the side groups and form hybrid phosphazene/organosilicon polymers. A number of these polymers are rubbery elastomers which are readily cross-linked by heat or light. Seven of the mixed-substituent, cross-linked polymers were incorporated into interpenetrating polymer networks (IPN's) with polystyrene, poly(methyl methacrylate), polyacrylonitrile, poly(acrylic acid) and poly (dimethylsiloxane). The phase compatibility characteristics of the IPN's were assessed by DSC, TEM, FT-IR spectroscopy, and 1H and 31P NMR spectroscopy data.

14 Claims, 13 Drawing Sheets
(13 of 15 Drawning(s) in Color)

POLYPHOSPHAZENES WITH UNSATURATED SIDE GROUPS USEFUL AS REACTION INTERMEDIATES, CROSS-LINKABLE POLYMERS, AND AS COMPONENTS OF INTERPENETRATING POLYMER NETWORKS

GOVERNMENT SPONSORSHIP

This invention was made with Government support under Contract Number DAAL03-91-G-0124 awarded by the United States Department of the Army. The Government has certain rights in this invention.

FIELD OF THE INVENTION

The present invention relates to polyphosphazene derivatives with unsaturated side groups. The polyphosphazenes are useful as reaction intermediates, cross-linkable polymers, and as components of interpenetrating polymer networks.

BACKGROUND OF THE INVENTION

Phosphazene high polymers may be represented by the general structure 1, in which the side groups, R, can be organic, organometallic, or inorganic units, and the degree of polymerization, n, may be 15,000 or higher. Thus, the molecular weights can range as high as $2 \times 10^6$ to $6 \times 10^6$. Most polymers of this type are prepared via a ring-opening polymerization of an inorganic monomer (2) to give a reactive polymeric intermediate (3), followed by macromolecular substitution reactions as shown in Scheme I.

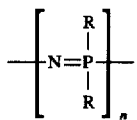

Scheme I

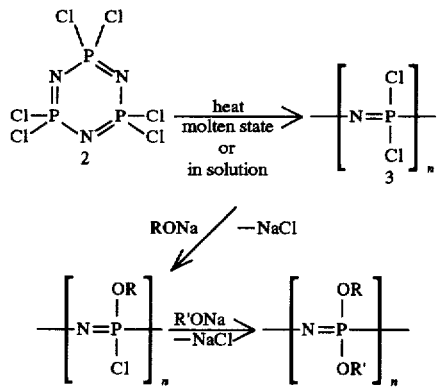

The properties of the resultant poly(organophosphazenes) depend on the types of side groups linked to the polymer chain. In general, if the side groups are small or highly flexible organic units, the polymers will have low glass transition temperatures (−100° C. to −30° C.). Bulkier side groups, especially those that contain aromatic residues, raise the Tg markedly as a result of their intramolecular steric restrictions and inter-chain interactions. Superimposed on these primary structure-property relationships is the condition that some polymers that bear only one type of side group are microcrystalline, whereas polymer molecules that bear two or more side groups tend to be amorphous, presumably because of the resultant lack of molecular symmetry.

Polyphosphazenes that have elastomeric properties have been developed technologically to a higher level than any of the other materials based on a phosphorus-nitrogen backbone [Allcock, H. R. *Chem. Eng. News* 1985, 63(11), 22; Allcock, H. R. *Science* 1992, 255, 1106]. Rubber-elasticity in polyphosphazenes becomes manifest (a) in single-substituent polymers that have low glass transition temperatures and side groups that are sufficiently flexible to resist crystallization (e.g. $OCH_3$, $OC_2H_5$, $OCH_2CH_2OCH_2CH_2OCH_3$, etc.), or (b) mixed substituent polymers with low Tg's and, again, an amorphous morphology.

The two main classes of commercial phosphazene elastomers utilize this last principle, and have the general structures shown in formulas 4 and 5 [Tate, D. P. *J Polymer Sci. Polymer Symp.* 1974, 48, 33; Penton, H. R. *Kautch. Gummi, Kunstat.*, 1986, 39 301]. We have recently described an additional class of elastomers based on the structure shown in formula 6 [Allcock, H. R.; Kim, Y. B. *Macromolecules* 1994, 27(14), 3933]. Note that structures represented by the formulas 4–6 represent a few of many possible side group arrangements, including species with geminal structures.

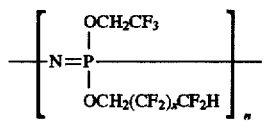

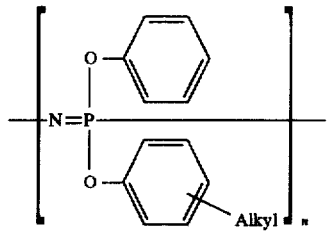

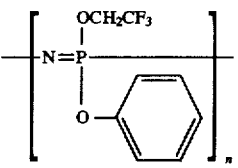

Species 4 and 5 are converted to useful elastomers by cross-linking reactions that involve the incorporation of a few percent of unsaturated (usually allyl) co-substituent units specifically introduced at the macromolecular substitution stage. The development of these and other methods of cross-linking underlie the conversion of a whole range of different polyphosphazenes into useful materials [Allcock, H. R. *Chem. of Materials* 1994, 6(11), 1476].

SUMMARY OF THE PRESENT INVENTION

In the present work, we have designed and synthesized several new phosphazene mixed substituent phosphazene elastomer systems that can be cross-linked either thermally or by exposure to ultraviolet light. Interpenetrating polymer networks (IPNs) derived from cross-linked polyphosphazenes allow the materials' properties to be varied over a broad range depending on the nature and ratios of their component polymers. The work illustrates that the poly(organo phosphazenes) described here are an excellent choice for incorporation into IPNs because of the ease with which the properties can be changed by varying the side groups. In general, IPNs that contain poly (organophosphazenes) are expected to be more flame resistant than their totally organic counterparts. Moreover, incorporation of these polymers into IPNs provides a way to utilize the unique properties of these macromolecules in combination with the advantages of conventional polymers in membranes and biomedical materials.

We have designed and synthesized a series of new polymers that bear either 2-butenoxy or 4-allyloxyphenylphenoxy groups. We have examined the use of the 4-allyloxyphenylphenoxy units as sites for the linkage of organosilicon extension groups, and have employed the two types of unsaturated side groups as cross-link sites en route to the preparation of interpenetrating polymer networks with more conventional organic polymers. The development of an ultraviolet photocrosslinking system was of particular interest.

The new polymers contain 2-butenoxy and/or 4-allyloxyphenylphenoxy side groups. Specific examples of the new polymers illustrated in this application also contain one or more of the following different types of side groups: trifluoroethoxy, benzyloxyphenoxy, and phenoxy. Structure 7 illustrates the general composition of these polymers, although the disposition of the various side groups along the chain may differ from that shown. In structure 7, R=CH$_3$CH=CHCH$_2$O—, R'=CF$_3$CH$_2$O— or C$_6$H$_5$O—, and R"=C$_6$H$_5$CH$_2$OC$_6$H$_4$O— or CH$_2$=CHCH$_2$OC$_6$H$_4$C$_6$H$_4$O—. The ratio of the various sidegroups is not particularly limited and the invention is not limited to polymers containing only these additional sidegroups (trifluoroethoxy, benzyloxyphenoxy, and phenoxy) as the invention includes any polyphosphazenes containing 2-butenoxy and/or 4-allyloxyphenylphenoxy side groups. The value of n can range from 300 to 100,000, preferably 3,000 to 50,000, and most preferably 5,000 to 20,000. The 2-butenoxy and 4-allyloxyphenylphenoxy groups were chosen both as cross-link sites and as functional units for secondary reactions. Specific examples containing trifluoroethoxy side groups were included because of this groups hydrophobicity and its known ability to generate polymer chain flexibility and low glass transition temperatures. The p-benzyloxyphenoxy side units were employed as rigid, hydrophobic units that would be appropriate for subsequent reactions [Medici, A.; Fantin, G.; Pedrini, P.; Gleria, M.; Minto, F. *Macromolecules* 1992, 25(10), 2569].

Additional cosubstituents useful in the present invention include alkoxy groups —O(CH$_2$)$_x$CH$_3$ where x is 0 to 50 and branched counterparts; alkyl ether groups of the type —O(CH$_2$CH$_2$O)$_x$OR where x is 1 to 100 and R is any alkyl or aryl group; aryloxy groups —OBzR where R is halogen, alkyl, or aryl in the ortho-, meta- or para-positions; alkylamino groups of the type —NHR; arylamino groups —NHAr including secondary amino groups; organosilicon groups such as —CH$_2$SiR$_3$; or a wide variety of alkyl or aryl groups linked to phosphorus through P—C bonds.

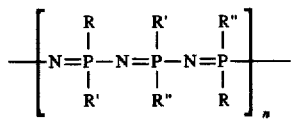

The polymers were synthesized by the treatment of solutions of poly(dichlorophosphazene), [NPCl$_2$]$_n$ (3) in tetrahydrofuran (THF) with solutions or suspensions of the nucleophiles, CH$_3$CH=CHCH$_2$ONa, CF$_3$CH$_2$ONa, C$_6$H$_5$ONa, C$_6$H$_5$CH$_2$OC$_6$H$_4$ONa or CH$_2$=CHCH$_2$OC$_6$H$_4$OC$_6$H$_4$ONa in the same solvent. Hence, these reactions involved simultaneous competition by the nucleophiles for the reactive sites along the polymer backbone. Because the nucleophiles had different reactivities, the ratios of the side groups incorporated into each polymer did not directly reflect the ratios of the nucleophiles in the reaction mixtures. For example, the incorporation of the aryloxy side groups was less facile than that of the aliphatic nucleophiles, presumably for reasons of steric hindrance.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE INVENTION

Figure 1:
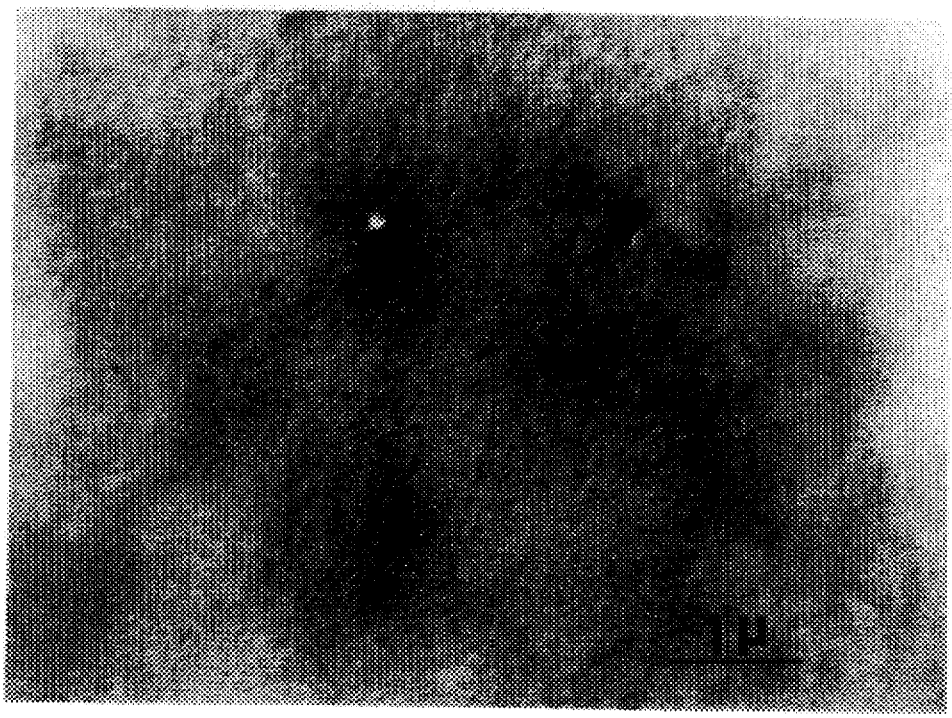
FIG. 1 shows a transmission electron micrograph of polymer 13 before incorporation of organic polymer into an IPN system.

Poly[bis(2-butenoxy)phosphazene], a new elastomeric polymer represented by the formula 8 was synthesized by the reaction of CH$_3$CH=CHCH$_2$ONa with [NPCl$_2$]$_n$ (3). This polymer crosslinks spontaneously in the dry state when exposed to the atmosphere to give a soft, rubber-elastic material. The elongation at break of this polymer is more than 900% and the polymer retracts immediately to its original dimensions even after repeated stretching. Cross-linking can be retarded by storage of the polymer in solution in hexane or as a solvent-swollen organogel. The degree of cross-linking increased markedly when polymer 8 was exposed to UV light at 254 nm. Exposure times of 5 and 15 minutes introduced cross-links that limited the solvent imbibition volume to 1.7 and 0.9, and markedly reduced the flexibility and elasticity. Hence, the polymer is quite sensitive to photolytic cross-linking.

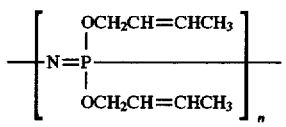

(8)

This is an extraordinary elastomer from a fundamental research viewpoint, but it is clearly of limited practical utility because of its high sensitivity to undergo cross-linking in the atmosphere and when exposed to light. However, it suggested ways in which more controllable systems might be designed and prepared—specifically species in which the unsaturated units are diluted by other side groups which themselves confer additional properties on the system.

Polymers with 2-butenoxy and other co-substituent groups are shown as species represented by formulas 9–12. Full characterization data for polymers 9–12 are shown in Table 1. The properties of these polymers are as follows: polymer 9 is an opaque, white, amorphous, film-forming elastomer with a glass transition temperature of −68° C. DSC measurements indicate that it is amorphous. It is soluble in organic solvents such as THF. The polymer cross-links when exposed to UV radiation at room temperature. The $^1$H NMR spectrum of polymer 9 showed a series of peaks at 4.38 ppm (broad) (OC$\underline{H}_2$CH); 5.74 (OCH$_2$C$\underline{H}$=CH); 5.55 (CH=C$\underline{H}$CH$_3$); 1.68 (CH=CHC$\underline{H}_3$) and 1.80 (OC$\underline{H}_2$CF$_3$). The $^{31}$P NMR spectra consisted of two broad peaks at −5 (shoulder) and −6.98 ppm which result from the different phosphorus environments in the polymer—i.e. phosphorus atoms with two of the same substituents and phosphorus atoms with two different substituents.

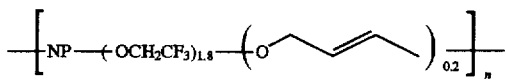

(9)

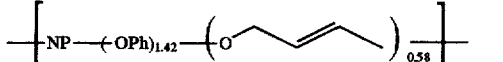

(10)

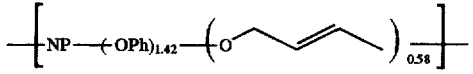

(11)

(12)

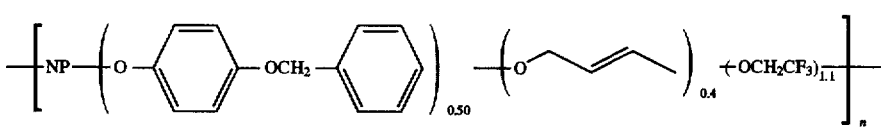

TABLE 1

Poly(organophosphazene) Characterization Data

| Example | Polymer | $^1$H NMR (ppm) | $^{31}$P NMR (ppm) | DSC Tg (°C.) |
|---|---|---|---|---|
| 2 | 9 | 4.38 (br) (OC$\underline{H}_2$CH)<br>5.74 (OCH$_2$C$\underline{H}$=CH)<br>5.55 (CH=C$\underline{H}$CH$_3$)<br>1.68 (CH=CHC$\underline{H}_3$)<br>1.80 (OC$\underline{H}_2$CF$_3$) | −5 (br sh)/<br>−6.98 (br) | −68 |
| 3 | 10 | 7.00 ppm (C$_6$H$_5$)<br>4.25 (OC$\underline{H}_2$CH)<br>5.50 (OCH$_2$C$\underline{H}$=CH)<br>5.35 (CH=C$\underline{H}$CH$_3$) | −13.84/−16.18/<br>−19.18 | −15 |
| 4 | 11 | 1.60 (CH=CHC$\underline{H}_3$)<br>6.83, 6.46 (C$_6$H$_4$)<br>4.53 (bzOC$\underline{H}_2$bz)<br>7.12 (C$_6$H$_5$)<br>4.19 (OC$\underline{H}_2$CH)<br>5.67 (OCH$_2$C$\underline{H}$=CH)<br>5.52 (CH=C$\underline{H}$CH$_3$)<br>1.65 (CH=CHC$\underline{H}_3$) | −14.88/−16.25/<br>−17.36 | 27 |
| 5 | 12 | 7.04, 6.81 (C$_6$H$_4$)<br>4.91 (bzOC$\underline{H}_2$bz)<br>7.34 (C$_6$H$_5$)<br>4.19 (OC$\underline{H}_2$CH)<br>5.67 (OCH$_2$C$\underline{H}$=CH)<br>5.52 (CH=C$\underline{H}$CH$_3$)<br>1.65 (CH=CHC$\underline{H}_3$)<br>1.65 (OC$\underline{H}_2$CF$_3$) | −9.29 (br)/<br>−12.72 (br) | −18 |
| 6 | 13 | 7.11, 6.80 (bz rings)<br>4.55 (bzOC$\underline{H}_2$CH)<br>6.07 (C$\underline{H}$=CH$_2$)<br>5.45, 5.32 (CH=C$\underline{H}_2$)<br>1.45 (OC$\underline{H}_2$CF$_3$) | −9.50/−12.55/<br>−15.37 | 48 |
| 7 | 14 | 7.04, 6.68 (bz rings)<br>3.81 (bzOC$\underline{H}_2$)<br>1.18 (bzOCH$_2$OC$\underline{H}_2$)<br>0.14 (C$\underline{H}_2$Si, SiC$\underline{H}_3$)<br>3.67 (SiOC$\underline{H}_2$)<br>0.70 (SiOCH$_2$C$\underline{H}_3$)<br>1.80 (OC$\underline{H}_2$CF$_3$) | −13.49/<br>−15 (shoulder) | 42 |
| 8 | 15 | 7.05, 6.72 (bz rings)<br>3.84 (bzOC$\underline{H}_2$)<br>1.20 (bzOCH$_2$OC$\underline{H}_2$)<br>0.11 (C$\underline{H}_2$Si, SiC$\underline{H}_3$)<br>3.70 (SiOC$\underline{H}_2$)<br>0.68 (SiOCH$_2$C$\underline{H}_3$)<br>1.82 (OC$\underline{H}_2$CF$_3$) | −13.43/<br>−15 (shoulder) | 66 |

The polymer represented by formula 10 is also an opaque, flexible film-forming elastomeric, amorphous material with a glass transition temperature of −15° C. This polymer is soluble in THF. The polymer crosslinks following exposure to UV radiation at room temperature especially in the presence of 2 mole percent benzoyl peroxide initiator. The $^1$H NMR spectrum of polymer 10 showed a series of peaks at 7.00 ppm (C$_6$H$_5$); 4.25 (OCH$_2$CH); 5.50 (OCH$_2$C$\underline{H}$=CH); 5.35 (CH=C$\underline{H}$CH$_3$); and 1.60 (CH=CHC$\underline{H}_3$). The $^{31}$P NMR spectrum contained three peaks at −13.84, −16.18 and −19.18 ppm which correspond to the three phosphorous environments generated by the two substituents.

The polymer represented by formula 11 is a transparent, colorless, brittle, film-forming material with a glass transition temperature of +27° C. DSC measurements indicated that the material is amorphous. Polymer 11 is soluble in both THF and dioxane. The polymer cross-links when exposed to UV radiation at room temperature. The $^1$H NMR spectrum of polymer 11 contained a series of peaks at 6.83, 6.46 ppm (C$_6$H$_4$); 4.53 (bzOCH$_2$bz); 7.12 (C$_6$H$_5$); 4.19 (OCH$_2$CH); 5.67 (OCH$_2$C$\underline{H}$=C$\overline{H}$); 5.52 (CH=C$\underline{H}$CH$_3$); and 1.65 (CH=CHC$\underline{H}_3$). The $^{31}$P NMR spectrum had three peaks at −14.88, −16.25 and −17.36 ppm which corresponded to the three different phosphorous environments that result from PR$_2$, PRR' and PR'$_2$ structures.

The polymer represented by formula 12 is a beige colored, elastomeric, amorphous and very flexible transparent material with a Tg at −18° C. Polymer 12 is soluble in THF and other common organic solvents. The polymer cross-links when exposed to UV radiation at room temperature. The $^1$H NMR spectrum of polymer 12 consisted of a series of peaks at 7.04, 6.81 ppm (C$_6$H$_4$); 4.91 (bzOCH$_2$bz); 7.34 (C$_6$H$_5$); 4.19 (OCH$_2$CH); 5.67 (OCH$_2$C$\underline{H}$=C$\overline{H}$); 5.52 (CH=C$\underline{H}$CH$_3$); and 1.65 (CH=CHC$\underline{H}_3$) and (OCH$_2$CF$_3$). The $^{31}$P NMR spectrum contained two broad peaks at −9.29 and −12.72 ppm which correspond to two different phosphorus environments generated by the disposition of the three side groups.

Polymers based on the 4-allyloxyphenylphenoxy groups are shown as species represented by the formulas 13–15. Full characterization data for polymers 13–15 are depicted in Table 1. All three were prepared as described in the Examples. The polymer represented by formula 13 is a transparent, slightly brittle, amorphous film-forming material with a Tg at +48° C. The $^1$H NMR spectrum of polymer 13 contained a series of peaks at 7.11, 6.80 ppm (bz rings); 4.55 (bzOCH$_2$CH); 6.07 (C$\underline{H}$=CH$_2$); 5.45, 5.32 (CH=C$\underline{H}_2$) and 1.45 (OC$\underline{H}_2$CF$_3$). The $^{31}$P NMR spectrum consisted of three peaks at −9.50, −12.55 and −15.37 ppm which correspond to the three different types of substitution patterns at phosphorous. This polymer could be isolated and stored in the solid state without cross-linking. However, the material cross-links when exposed to UV radiation at room temperature. Species 13 was soluble in THF. This polymer was examined from two points of view—first, as the cross-linked initial component for IPN preparation (see later) and, second, as a reaction intermediate for the linkage of organosilicon side chains.

Hybrid organophosphazene/organosilicon polymers have been prepared by several routes in the past [Allcock, H. R.; Coggio, W. D.; Archibald, R. S.; Brennan, D. J. *Macromolecules* 1989, 22, 3571; Allcock, H. R.; Coggio, W. D. *Macromolecules* 1990, 23, 1626; Wisian-Nielson, P.; Islam, M. S. *Macromolecules* 1989, 22, 2026]. The method described here involves the addition of dimethylethoxy silane (to form 14) or heptamethyltrisiloxane followed by dimethylethoxy silane (to yield 15) to the allyl double bond of 13, both reactions being carried out in the presence of platinum divinyltetramethyldisiloxane complex as a coupling agent. Polymer 14 is a transparent, beige, amorphous material with a Tg of +42° C. It was soluble in THF. The $^1$H NMR spectra of polymer 14 contained a series of peaks at 7.04, 6.68 ppm (bz rings); 3.81 (bzOC$\underline{H}_2$); 1.18 (bzOCH$_2$OC$\underline{H}_2$); 0.14 (C$\underline{H}_2$Si, SiCH$_3$); 3.67 (SiOC$\underline{H}_2$); 0.70 (SiOCH$_2$C$\underline{H}_3$); and 1.80 (OC$\underline{H}_2$CF$_3$). The $^{31}$P NMR spectrum consisted of two very broad peaks at −13.49 and −15 (shoulder) ppm (the third peak being obscured by the other two peaks). The polymer was sensitive to cross-linking when exposed to air and was cross-linked further when exposed to UV radiation.

The polymer represented by formula 15 also was a transparent, amorphous, slightly brittle material with a Tg of +66° C. This material was soluble in THF. The $^1$H NMR spectrum of polymer 15 shows a series of peaks at 7.05, 6.72 ppm (bz rings); 3.84 (bzOC$\underline{H}_2$); 1.20 (bzOCH$_2$OC$\underline{H}_2$); 0.11 (C$\underline{H}_2$Si, SiCH$_3$); 3.70 (SiOC$\underline{H}_2$); 0.68 (SiOCH$_2$C$\underline{H}_3$); and 1.82 (OC$\underline{H}_2$CF$_3$). The $^{31}$P NMR spectrum consists of two very broad peaks at −13.43 and −15 (shoulder) ppm (the other peaks were obscured by the detected peaks in the spectrum) which correspond to the different types of environments of the phosphorous in the polymer backbone. This polymer too was prone to cross-linking when exposed to air. It cross-linked further when exposed to UV radiation.

Interpenetrating Polymer Networks

In general terms, interpenetrating polymer networks (IPNs) are prepared by the polymerization of a monomer within the cross-linked matrix of another polymer. This procedure results in an intimate mixing of the macromolecular components and provides greater opportunities for intermolecular interactions between the two polymers than may be found in conventional polymer blends [Sperling, L. H., *Interpenetrating Polymer Networks and Related Materials*; Plenum Press: New York, 1981; Sperling, L. H., *Chemtech* 1988, 18, 104]. The intimate mixing of the components in IPNs also generates a much finer and more integrated domain structure than would be possible in most other multicomponent polymer systems. In earlier work we described IPNs prepared from radiation cross-linked polyphosphazenes and organic polymers [Visscher, K. B.; Manners, I.; and Allcock, H. R. *Macromolecules* 1990, 22, 4885; Allcock, H. R.; Visscher, K. B.; Manners, I. *Chem. of Materials* 1992, 4, 1188].

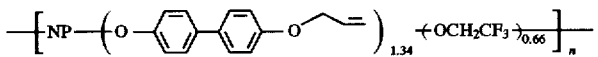

13

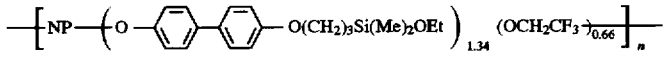

14

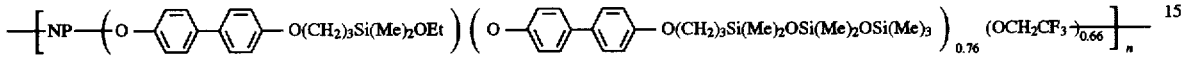

15

The seven phosphazene polymers represented by the formulas 9–15 served as the initial cross-linked polymer matrices for this present work. Exposure of the polymers to light or heat induced cross-linking and yielded materials which would no longer dissolve in, but would swell in organic solvents or organic/inorganic monomers to form organo-gels. Poly(organophosphazenes) 14 and 15 were cross-linked thermally, while polyphosphazenes 9, 11, 12 and 13 were cross-linked by exposure to UV radiation. Benzoyl peroxide was added to poly(organophosphazene) 10 to aid in the UV cross-linking of the polymer. Cross-linking took place at the unsaturated bonds in phosphazene polymers 9, 10, 11, 12 and 13, but by the elimination of H—SiOEt in polyphosphazenes 14 and 15. The monomers used for the formation of the second polymer in each IPN included styrene, methyl methacrylate, acrylonitrile, acrylic acid and octamethylcyclotetrasiloxane. The organic monomers used in this study were polymerized and cross-linked either thermally (styrene, methyl methacrylate and octamethyltetrasiloxane) or by exposure to $^{60}$Co γ-radiation. Potassium hydroxide was used as the polymerization initiator for octamethylcyclotetrasiloxane, and cross-linking was subsequently accomplished by exposure of the system to $^{60}$Co γ-radiation. No solvents were employed for the swelling of the organic monomer systems, but THF was used to aid in the swelling by the cyclo siloxane. These monomers yielded the polymers depicted in formulas 16–20. The value of n for these polymers is not particularly limited and may range from 100 to 100,000.

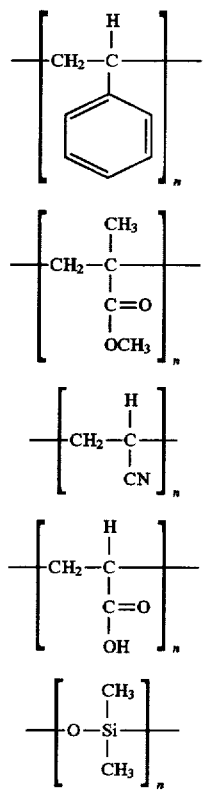

Additionally, almost any polymer made by the addition polymerization of an unsaturated monomer can be used with the polyphosphazenes of the present invention to produce IPNs. They include any alkyl or aryl methacrylate or acrylate and vinyl compounds such as vinyl chloride and vinyl acetate. In addition, any polymer made by ring-opening polymerization such as nylon-6 from caprolactam, polylactones, polyformaldehyde, polylactic and glycolic acids (all of which need a catalyst and are not polymerized by light or high energy radiation). Also, condensation polymers such as nylon-6,6 or polyesters such as poly(ethylene terephthalate) may be used.

The synthesis of polyphosphazene IPNs is described in the Experimental section. For example, a sample of cross-linked phosphazene polymer 14, was allowed to imbibe a solution of styrene monomer, azobisisobutyronitrile (AIBN) initiator, and ethylene glycol dimethacrylate cross-linking agent. After a period of 72 hours at 25° C., the resultant organogel had swollen to more than ten times its original volume. The styrene component was then polymerized thermally, and the unpolymerized styrene and oligomers were removed by solvent extraction. The ratio of polyphosphazene to organic polymer is not particularly limited. It will preferably range from 100:1 to 1:100 and more preferably 26:1 to 1:35.

The IPNs were characterized by FT-IR, $^1$H and $^{31}$P NMR spectroscopy, differential scanning calorimetry (DSC) and transmission electron microscopy (TEM). FT-IR and NMR spectroscopy were used mainly to confirm the presence of the component materials in the IPN, while NMR was used to provide a rough estimate of the component ratios in the IPN. The final IPN ratios, determined by $^1$H NMR spectroscopy, are depicted in Table 2.

TABLE 2

Component Polymer Ratios for Semi-Miscible IPNs

| IPN Component Polymers | Ratio* |
| --- | --- |
| 9/16 | 1:1 |
| 9/17 | 1:1 |
| 10/16 | 1:2 |
| 11/16 | 1:3 |
| 11/17 | 1:8 |
| 11/18 | 1:4 |
| 11/19 | 26:1 |
| 12/16 | 1:2 |
| 12/17 | 1:1 |
| 13/16 | 1:2 |
| 13/17 | 1:1 |
| 13/19 | 4:1 |
| 13/20 | 1:35 |
| 14/16 | 3:1 |
| 14/17 | 1:1 |
| 15/16 | 1:2 |
| 15/17 | 1:1 |

*Ratios determined by $^1$H NMR Spectroscopy

DSC characterization is based on the following precepts. In a miscible IPN, only one glass transition temperature (Tg) is detected in the DSC spectrum, located between the values of the component polymer Tg values. In a semi-miscible IPN, either two Tg's are detected displaced toward the center of the spectrum from the values of the parent polymers, or three transitions are found, two displaced toward the center of the spectrum and one located between the values of the component polymers. This third transition indicates that significant intermolecular interactions exist between the component materials. In a totally immiscible system, two Tg's may be found at the Tg values of the component polymers.

TEM allowed the phase domain structure of each IPN to be determined. Electron microscopy is probably the most sensitive way to assess the miscibility or homogeneity of an IPN system. Even if an IPN appears to be totally miscible by DSC, a definite domain structure may still be detected by TEM analysis. Only samples with high structural rigidity can be examined using transmission electron microscopy due to the limitations of the methods of sample preparation. Thus, DSC is used as a primary means for the detection of miscibility, but TEM is needed to determine the extent of phase separation within the semi-miscible material.

Several combinations of poly(organophosphazenes) of formulas 9–15 formed semi-miscible IPNs with the organic or inorganic-organic monomers used to produce the polymers represented by formulas 16–20. These semi-miscible combinations and their Tg values are listed in Table 3. A number of the semi-miscible combinations of phosphazene polymers 9–15 and organic polymers 16–20 were characterized by transmission electron microscopy. The properties and TEM micrographs of these mixtures are described in Table 4 and the TEM micrographs are depicted in FIGS. 2–13. One illustrative example is described below.

Figure 2:
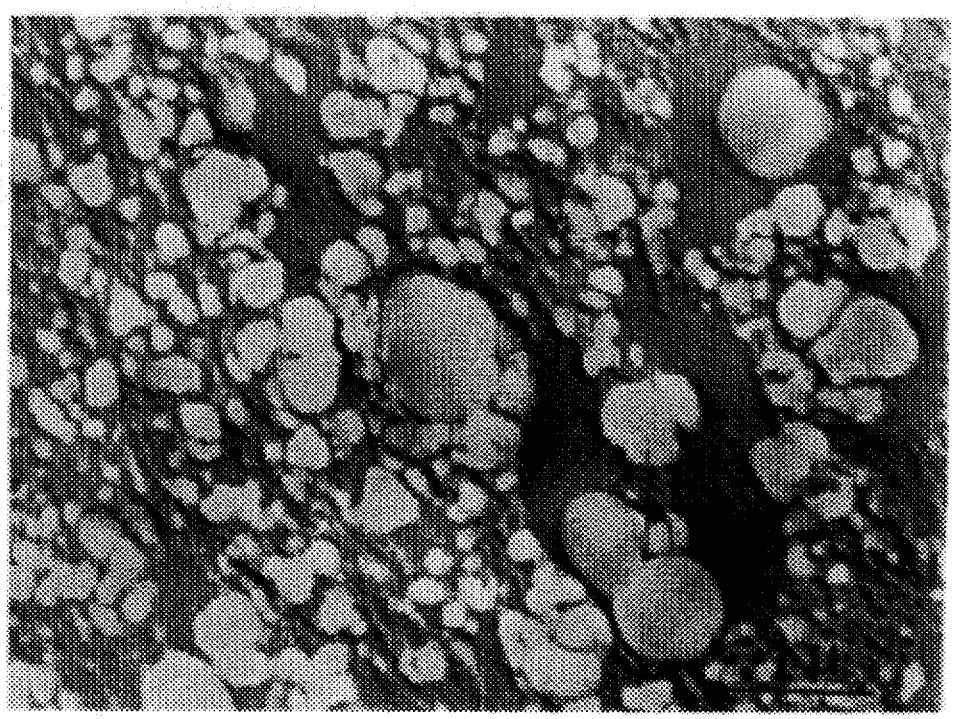
FIG. 2 shows a transmission electron micrograph of an IPN composed of polymers 13 and 16.
Figure 3:
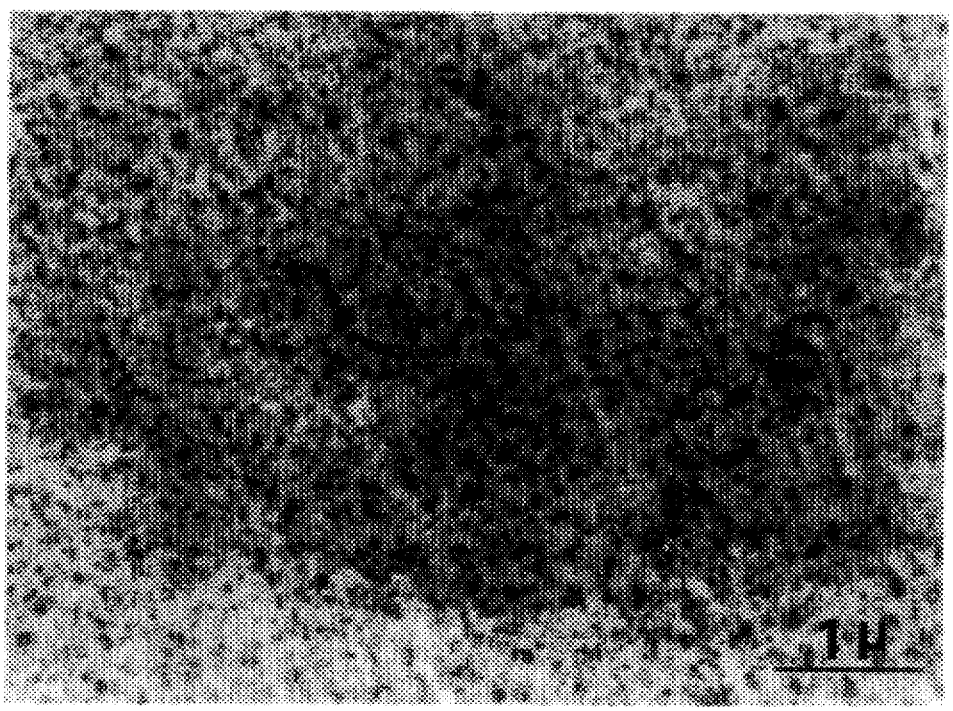
FIG. 3 shows a transmission electron micrograph of an IPN composed of polymers 13 and 17.
Figure 4:
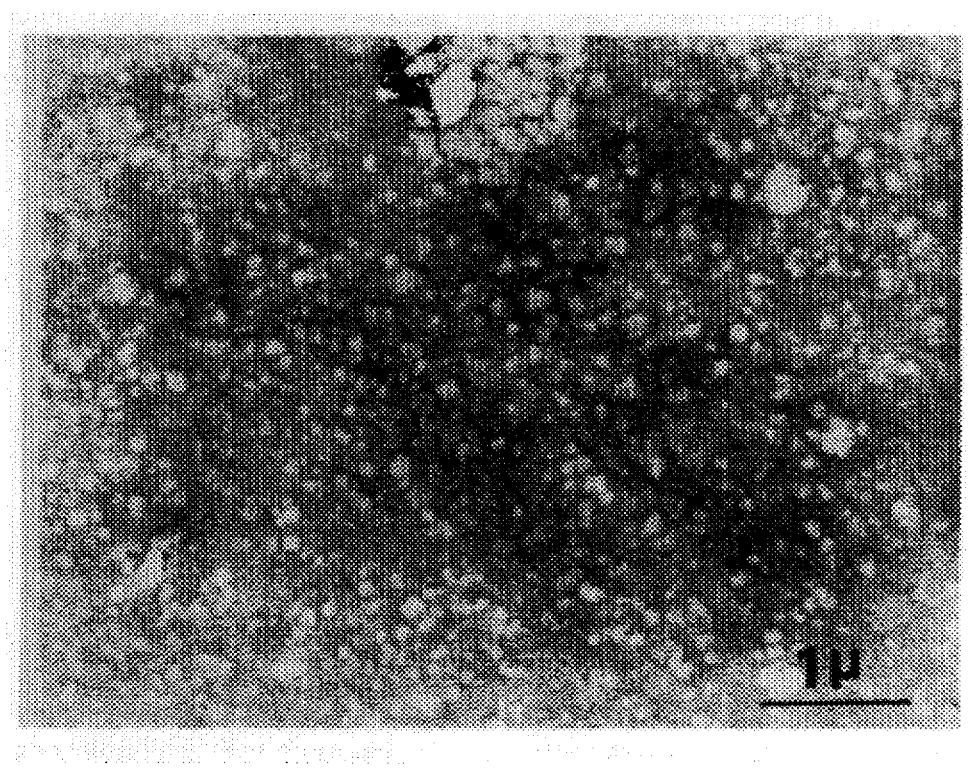
FIG. 4 shows a transmission electron micrograph of an IPN composed of polymers 13 and 19.
Figure 5:
FIG. 5 shows a transmission electron micrograph of an IPN composed of polymers 14 and 17.
Figure 6:
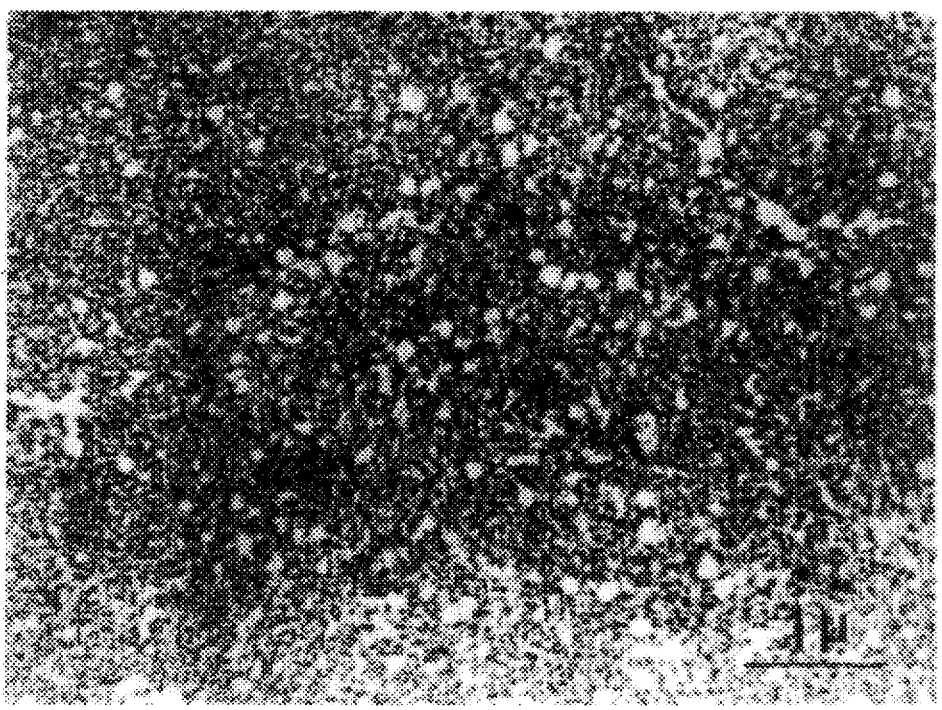
FIG. 6 shows a transmission electron micrograph of an IPN composed of polymers 15 and 17.
Figure 7:
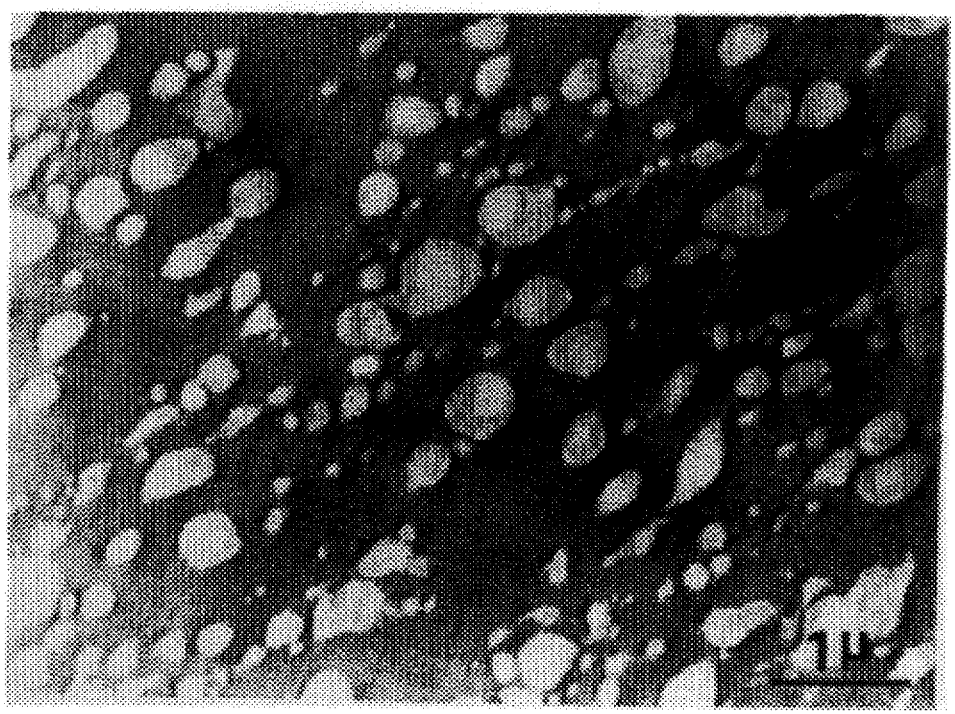
FIG. 7 shows a transmission electron micrograph of an IPN composed of polymers 12 and 16.
Figure 8:
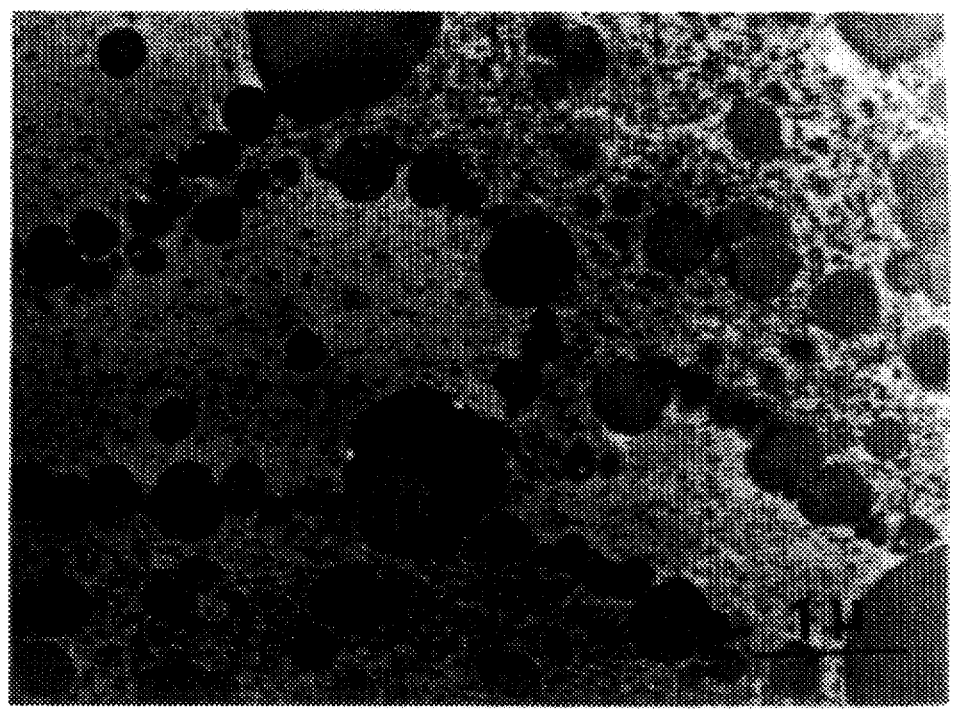
FIG. 8 shows a transmission electron micrograph of an IPN composed of polymers 12 and 17.
Figure 9:
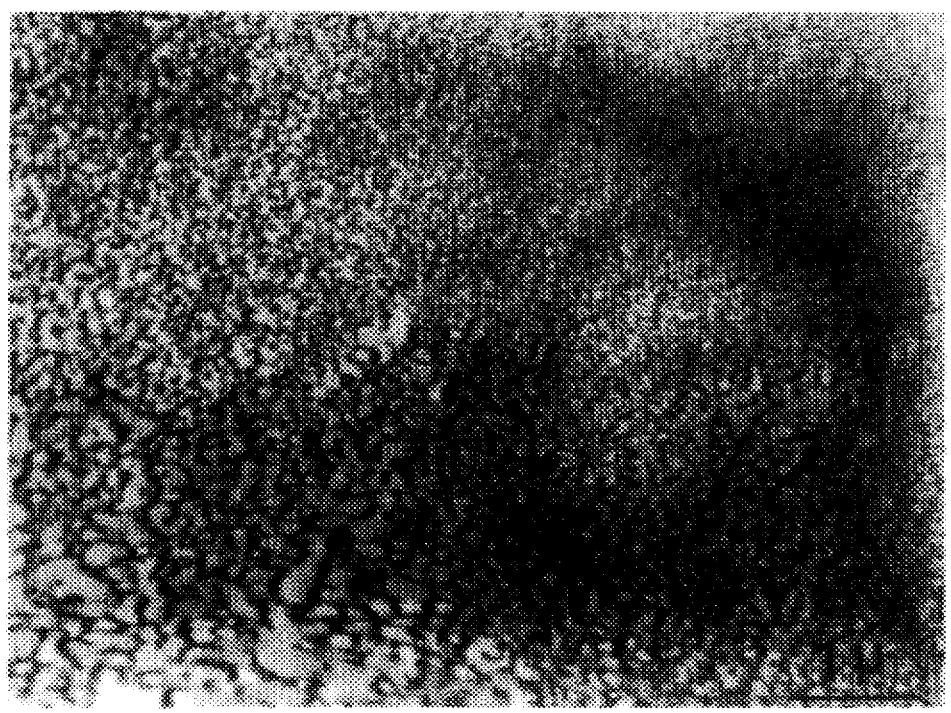
FIG. 9 shows a transmission electron micrograph of an IPN composed of polymers 11 and 17.
Figure 10:
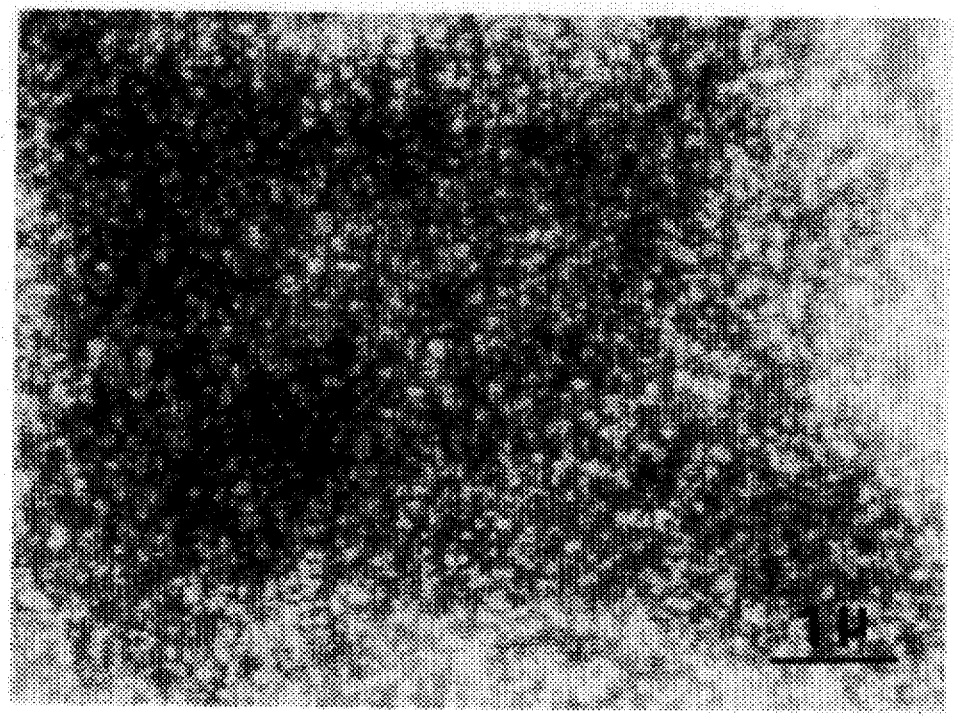
FIG. 10 shows a transmission electron micrograph of an IPN composed of polymers 11 and 18.
Figure 11:
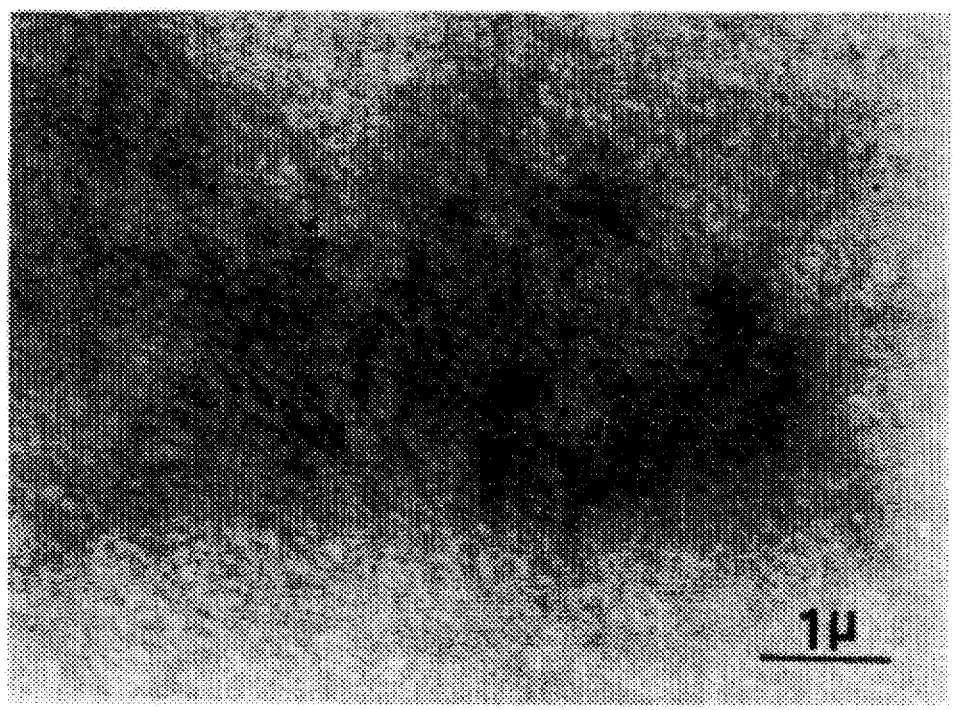
FIG. 11 shows a transmission electron micrograph of an IPN composed of polymers 11 and 19.
Figure 12:
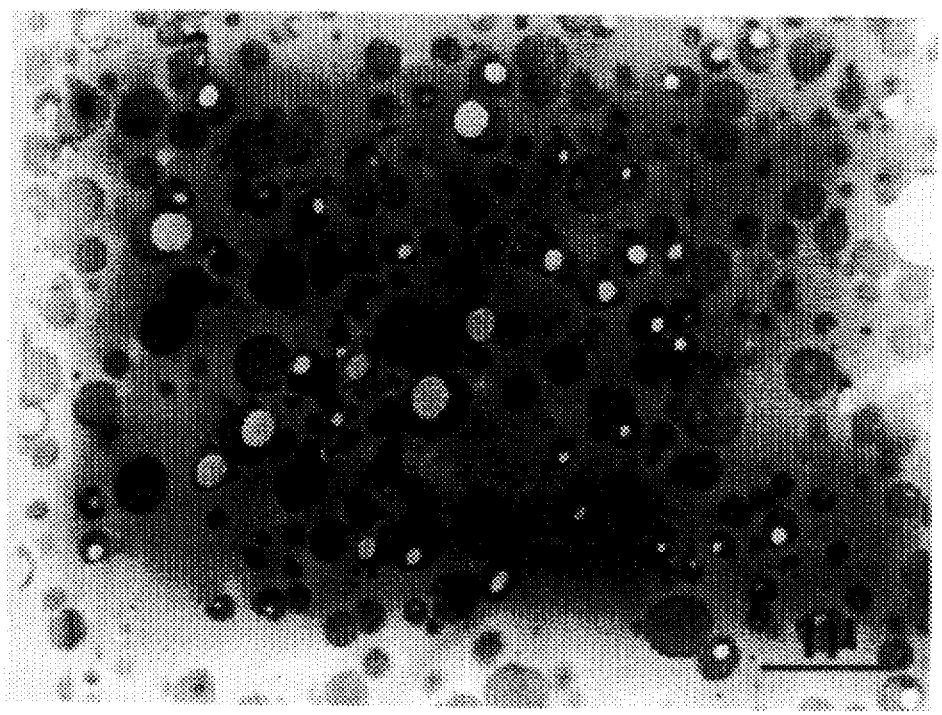
FIG. 12 shows a transmission electron micrograph of an IPN composed of polymers 9 and 17.
Figure 13:
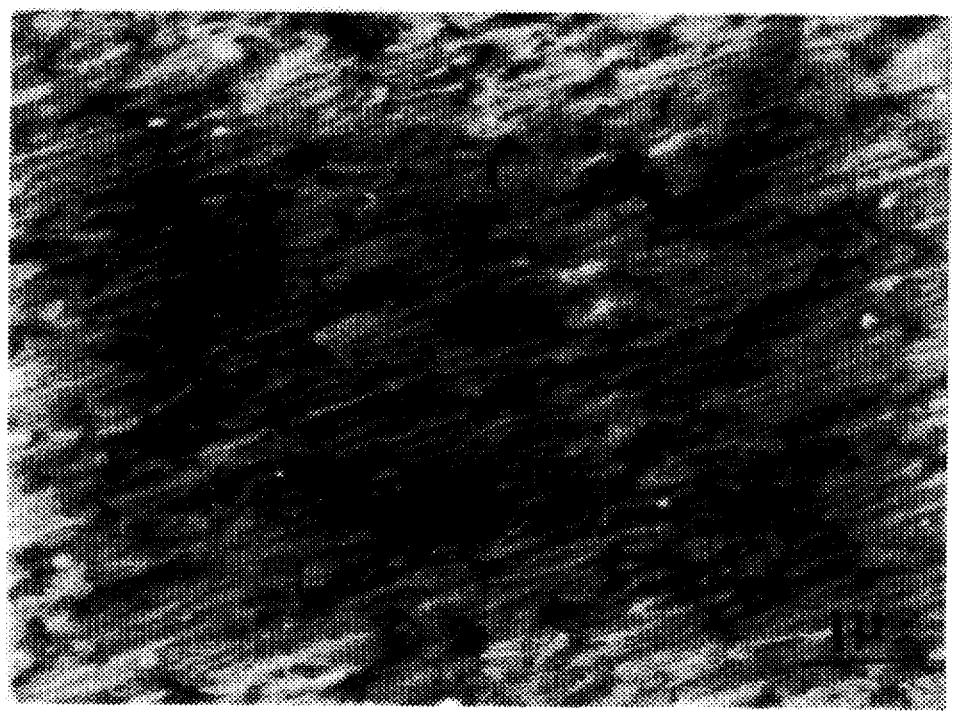
FIG. 13 shows a transmission electron micrograph of an IPN composed of polymers 10 and 16.

The TEM micrograph of polymer 13 is depicted in FIG. 1. Polymer 13 forms semi-miscible IPNs with polystyrene (16), poly(methyl methacrylate) (17), poly(acrylic acid) (19) and poly(dimethylsiloxane) (20). The semi-miscible IPN formed from polymers 13 and 16 is a hard, opaque, white material which shows a single Tg in the DSC thermogram at 74° C. This value is intermediate between the Tg's of the separate polymers, which occur at 48° C. (13) and 100° C. (16). The TEM micrograph of this material differs from that of pure polymer 13 (FIG. 1) and shows a distinct phase separation into regions of darker phosphazene polymer and lighter colored organic polymer (FIG. 2). This mode of visualization is possible because regions that contain heavier elements appear darker in a TEM microgram. This example illustrates the necessity for confirming miscibility, or semi-miscibility, using TEM microscopy. In this example, semi-miscibility may be due to intermolecular interactions such as van der Waals forces or side group stacking between the component materials.

TABLE 3

DSC Data for Semi-Miscible IPNs

| IPN Component Polymers | Tg (°C.) |
| --- | --- |
| 9/16 | 66 |
| 9/17 | 79 |
| 10/16 | 81 |
| 11/16 | 66 |
| 11/17 | 79/111 |
| 11/18 | 26/49 |
| 11/19 | 25/42 |
| 12/16 | 45 |
| 12/17 | 61 |
| 13/16 | 74 |
| 13/17 | 54/62 |
| 13/19 | 70/102 |
| 13/20 | −89/51 |
| 14/16 | 74 |
| 14/17 | 68 |
| 15/16 | 74/109 |
| 15/17 | 73 |

Component Polymer Tg's:
9 = −67° C.
10 = −15° C.
11 = 23° C.
12 = −18° C.
13 = 48° C.
14 = 42° C.
15 = 66° C.
16 = 100° C.
17 = 105° C.
18 = 85° C.
19 = 105° C.
20 = −124° C.

TABLE 4

IPN Characterization

| Figure | IPN Components | IPN Tg's | Component Tg's | IPN Appearance | TEM Comments |
| --- | --- | --- | --- | --- | --- |
| 2 | 13/16 | 74° C. | 48/100° C. | White, Opaque, Hard | Well dispersed phases in the range of 0.1–0.85µ |
| 3 | 13/17 | 54/62° C | 48/105° C. | Colorless, Transparent, Hard | Well dispersed phases in the range of 0.1–0.2µ |
| 4 | 13/19 | 70/102° C. | 48/100° C. | Beige, Opaque, Brittle | Well dispersed phases in the range of 0.05–0.35µ |
| 5 | 14/17 | 68° C. | 42/105° C. | Colorless, Transparent, Hard | Well dispersed domains in the range of 0.1–0.90µ |
| 6 | 15/17 | 73° C. | 66/105° C. | Colorless, Transparent, Hard | Very finely dispersed phases in the range of 0.05–0.25µ |
| 7 | 12/16 | 45° C. | −18/100° C. | White, Opaque, Hard | Well dispersed phases in the range of 0.1–0.85µ |
| 8 | 12/17 | 61° C. | −18/105° C. | Colorless, Transparent, Hard | Well dispersed phases in the range of 0.05–1.38µ |
| 9 | 11/17 | 79/111° C. | 23/105° C. | White, Opaque, Hard | Well dispersed phases in the range of 0.05–0.25µ |
| 10 | 11/18 | 26/49° C. | 23/85° C. | Beige, Opaque, Brittle | Well dispersed phases in the range of 0.05–0.15µ |
| 11 | 11/19 | 25/42° C. | 23/105° C. | Beige, Transparent, Brittle | Isolated organic polymer within phosphazene area. Domains were in the range of 0.05–0.25µ |
| 12 | 9/17 | 79° C. | −69/105° C. | Colorless, Transparent, Brittle | Isolated phosphazene within organic areas. Domains were in the range of 0.05–0.45µ |

TABLE 4-continued

| | | | IPN Characterization | | |
|---|---|---|---|---|---|
| Figure | IPN Components | IPN Tg's | Component Tg's | IPN Appearance | TEM Comments |
| 13 | 10/16 | 81° C. | −15/100° C. | Colorless, Transparent, Brittle | Streaks of organic within phosphazene regions. Domains were in the range of 0.05–0.17μ |

Experimental Section

Materials:

2,2,2-trifluoroethanol (Aldrich) was treated with sodium carbonate and was then distilled and stored over molecular sieves. 2-butenol (Aldrich) was distilled under vacuum. 4-benzyloxyphenol (Aldrich), 4,4'-biphenol (Aldrich), potassium hydroxide (Aldrich), sodium hydride (60% dispersion in mineral oil) (Aldrich), allyl bromide, benzoyl peroxide (Aldrich), sodium stick (Aldrich), dimethylethoxysilane (Huls America), heptamethyltrisiloxane (Huls America), absolute ethanol (Aldrich), platinum divinyltetramethyldisiloxane (Huls America), octachlorocyclotetrasiloxane (Huls America), and azobisisobutyronitrile (AIBN) (Polysciences Inc.) were used as received. Ethylene glycol dimethylacrylate (Aldrich) was distilled under vacuum and stored over 3 Å molecular sieves. Styrene (Aldrich), methyl methacrylate (Aldrich), acrylonitrile (Aldrich) and acrylic acid (Aldrich) were passed through alumina columns to remove inhibitors, and were then stored over 3 Å molecular sieves. Tetrahydrofuran (THF) and dioxane were distilled under an atmosphere of dry argon from a sodium benzophenone ketyl drying agent.

All phosphazene syntheses were carried out under an atmosphere of dry nitrogen. Hexachlorocyclotriphosphazene (supplied by Ethyl Corp.) was purified by vacuum sublimation, recrystallization (from hexane), and a final sublimation. Poly(dichlorophosphazene) was obtained by the molten-phase thermal polymerization (250° C.) of hexachlorocyclotriphosphazene in an evacuated sealed glass tube.

Analytical Equipment and Techniques:

$^1$H and $^{31}$P NMR spectra were recorded with the use of a Bruker WM-360 spectrometer operated at 360 MHz and 145.8 MHz respectively. For $^{31}$P NMR spectra, positive chemical shifts are downfield from that of external phosphoric acid. For $^1$H NMR spectroscopy, chemical shifts were recorded relative to tetramethylsilane at 0 ppm. Infrared spectra were estimated with use of a Perkin Elmer 1710 infrared Fourier transform spectrometer. The samples were prepared by pressing swollen IPN gels between salt plates. Glass transition temperatures (Tg) were recorded with the use of a Perkin Elmer DSC-7 unit equipped with a PE 7500 computer. The samples (10–30 mg) were analyzed in crimped aluminum pans: a heating rate of 40° C./min. and a helium flow of 10 mL/min. were used. The instrument was calibrated with a cyclohexane standard, with thermal transitions at −87.06 and 6.54° C. Polymers 18–20 were cross-linked by exposure to $^{60}$Co γ-radiation at the Breazeale Nuclear Reactor at the Pennsylvania State University. UV cross-linking was accomplished using a Rayonet photochemical reactor (The Southern N.E. Ultraviolet Co.) equipped with 16 Rayonet ultraviolet lamps (254 nm). The temperature of the sample was maintained near 25° C. by a cooling fan. Transmission Electron Micrographs (TEMs) were obtained using a JEOL 1200 EXII TEM with a power setting of 80 kV and an exposure time of 1 second. The magnification for all TEM photographs was 12076×. TEM samples were prepared using a LKB Ultratome III microtome.

EXAMPLE 1

Preparation of 4-(4'-Allyloxyphenyl)phenol

In a 1 L, three-necked, round bottom flask 4,4'-biphenol (40 g, 215 mmol) and potassium hydroxide (24 g, 430 mmol) were dissolved in 600 mL of absolute ethanol. The solution was warmed and allyl bromide (26 g, 215 mmol) was added. The reaction mixture was heated to reflux overnight, after which additional allyl bromide (13 g, 157 mmol) was added. The reaction mixture was refluxed for an additional 24 hours. The reaction mixture was cooled to room temperature and the solids were filtered. The filtrate was poured into distilled water (4 L) and then acidified with concentrated aqueous HCl. The solid product was filtered off and washed with a large amount of water and then dried. The product was purified by repeated recrystallization from ethanol. Product characterization included: m.p. 168°–170° C., $^1$H (200 MHz, CDCl$_3$): 7.05 (m, 4H), 6.8 (m, 4H), 6.1 (m, 1H), 4.4 (m, 2H).

EXAMPLE 2

Preparation of [NP(OCH$_2$CH=CHCH$_3$)0.2 (OCH$_2$CF$_3$)$_{1.8}$]$_n$—Formula (9)

To a solution containing poly(dichlorophosphazene) (3) (2 g, 34.4 mmol) in THF (200 mL) was added a solution containing sodium trifluoroethoxide in THF (30 mL) (prepared from trifluoroethanol (3.1 g, 31 mmol) and sodium (1 g, 43.5 mmol)). The reaction mixture was stirred at room temperature overnight. To the reaction mixture was added a solution CH$_3$CH=CHCH$_2$O$^-$ Na$^+$ in THF (100 mL) (from 2-butenol (1.3 g, 18 mmol) and sodium hydride (0.7 g, 17.5 mmol)). The reaction mixture was stirred for 24 hours and the polymer was isolated and purified by repeated precipitations into water (3×) and hexanes (1×). An $^1$H NMR spectrum was consistent with a polymer that contained 90% of trifluoroethoxy and 10% of 2-butenoxy side groups.

EXAMPLE 3

Preparation of [NP(OCH$_2$CH=CHCH$_3$)$_{0.58}$ (OC$_6$H$_5$)$_{1.42}$]$_n$—Formula (10)

To a solution of poly(dichlorophosphazene) (3) (6 g, 103.4 mmol) in THF (400 mL) was added a solution of sodium phenoxide (from phenol (7.1 g, 75.5 mmol) and sodium (1.8 g, 78.26 mmol) in THF (100 mL). The reaction mixture was heated at 45° C. for 36 hours and was then cooled to room temperature. To this reaction mixture was added a solution of CH$_3$CH=CHCH$_2$O$^-$ Na$^+$ (prepared from 2-butenol (4 g, 55.6 mmol) and sodium hydride (2.0 g, 50 mmol) in THF (100 mL). The reaction mixture was stirred at 25° C. for 24 hours and the polymeric product was purified by repeated precipitations into water (3×) and hexanes (1×). A $^{31}$P NMR spectrum suggested that this polymer contained 71% of phenoxy and 29% 2-butenoxy groups.

EXAMPLE 4

Preparation of [NP(OC$_6$H$_4$—OCH$_2$—C$_6$H$_5$)$_{1.22}$ (OCH$_2$CH=CHCH$_3$)$_{0.78}$]$_n$—Formula (11)

To a solution of poly(dichlorophosphazene) (3) (2 g, 34.4 mmol) in dioxane (400 mL) was added by syringe, a solution containing 100 mL dioxane, sodium 4-benzyloxyphenoxide (from 4-benzyloxyphenol (6.2 g, 31 mmol) and sodium hydride (1.3 g, 32.5 mmol). The reaction mixture was heated to reflux for 48 hours and then cooled to 25° C. A solution containing sodium 2-butenoxide (prepared from 2-butenol (1.9 g, 26.3 mmol) and sodium hydride (1.1 g, 27.5 mmol)) in THF (50 mL) was added to the mixture. The resulting mixture was stirred at 25° C. for 24 hours and the polymer was isolated and purified by repeated precipitations into water (3×) and hexane (1×). A $^{31}$P NMR spectrum suggested that the polymer contained 62% of 4-benzyloxyphenoxy and 38% of 2-butenoxy groups.

EXAMPLE 5

Preparation of [NP(OC$_6$H$_4$—OCH$_2$—C$_6$H$_5$)$_{0.50}$ (OCH$_2$CH=CHCH$_3$)$_{0.4}$(OCH$_2$CF$_3$)$_{1.1}$]$_n$— Formula (12)

Poly(dichlorophosphazene) (3) (3 g, 51.8 mmol) was treated with a mixture of the sodium salts of 4-benzyloxyphenol, 2,2,2-trifluoroethanol and 2-butenol. The sodium salt of 4-benzyloxyphenol was prepared by the treatment of 4-benzyloxyphenol (3.8 g, 19 mmol) with sodium hydride (0.88 g, 20 mmol) in THF (50 mL). The sodium salt of 2,2,2 trifluoroethanol was prepared by the treatment of 2,2,2-trifluoroethanol (2.2 g, 22 mmol) with sodium (0.88 g, 34 mmol) in THF (30 mL). The sodium salt of 2-butenol was prepared by the treatment of 2-butenol (1.6 g, 22.2 mmol) with sodium hydride (0.9 g, 22.5 mmol) in THF (30 mL). The salts prepared separately were combined and then added to the poly(dichlorophosphazene) solution. The reaction mixture was stirred for 48 hours and then concentrated. The polymeric product was then isolated and purified by repeated precipitation into water (3×) and hexane (1×). The $^1$H NMR spectrum showed that the resultant polymer contained 55% of 2,2,2-trifluoroethoxy, 20% of 2-butenoxy and 25% of 4-benzyloxy groups.

EXAMPLE 6

Preparation of [NP(OC$_6$H$_4$—C$_6$H$_4$— OCH$_2$CH=CH$_2$)$_{1.34}$(OCH$_2$CF$_3$)$_{0.66}$]$_n$ Formula (13)

Polymer 13 was synthesized by the sequential treatment of (NPCl$_2$)$_n$ (2 g, 34.4 mmol) in THF (200 mL) with CH$_2$=CHCH$_2$OC$_6$H$_4$C$_6$H$_4$O$^-$ Na$^+$ and sodium trifluoroethoxide. CH$_2$=CHCH$_2$OC$_6$H$_4$C$_6$H$_4$O$^-$ Na$^+$ was prepared by the treatment of CH$_2$=CHCH$_2$OC$_6$H$_4$C$_6$H$_4$OH (5.5 g, 24.3 mmol) with sodium hydride (0.95 g, 23.8 mmol) in THF (200 mL). Sodium trifluoroethoxide was prepared from trifluoroethanol (1.7g, 17 mmol) and sodium (0.6 g, 26.1 mmol) in THF (50 mL). The reaction between (NPCl$_2$)$_n$ and CH$_2$=CHCH$_2$OC$_6$H$_4$C$_6$H$_4$O$^-$ Na$^+$ was completed in 48 hours at 40° C. Sodium trifluoroethoxide was added at room temperature and the reaction mixture was stirred at room temperature for additional 24 hours. The solution was then concentrated and the polymer was isolated by precipitation into water. The polymer was further purified by repeated precipitation from a THF solution into water (3×) and hexane (1×). The polymer contained 67% of allyloxyphenylphenoxy and 33% of trifluoroethoxy groups as determined by $^1$H NMR spectroscopy.

EXAMPLE 7

Preparation of [NP(OC$_6$H$_4$—C$_6$H$_4$—O(CH$_2$)$_3$Si (CH$_3$)$_2$OCH$_2$CH$_3$)$_{1.34}$(OCH$_2$CF$_3$)$_{0.66}$]$_n$ Formula (14)

Polymer 13 (1 g, 2.12 mmol) was dissolved in chloroform (50 mL). Three drops of platinum divinyltetramethyldisiloxane complex were added to the dissolved polymer solution. After 20 minutes dimethylethoxysilane (1 g, 10 mmol) was added and the reaction mixture was stirred overnight at room temperature. The resultant polymer was purified by repeated precipitation from chloroform into ethanol to obtain polymer 14.

EXAMPLE 8

Preparation of [NP(OC$_6$H$_4$—C$_6$H$_4$—O(CH$_2$)$_3$Si (CH$_3$)$_2$OCH$_2$CH$_3$)$_{0.58}$ (OC$_6$H$_4$—C$_6$H$_4$—O(CH$_2$)$_3$Si (CH$_3$)$_2$OSi(CH$_3$)$_2$OSi(CH$_3$))$_{0.76}$(OCH$_2$CF$_3$)$_{0.66}$]$_n$ Formula (15)

Polymer 13 (1 g, 2.12 mmol) was dissolved in chloroform (50 mL). Three drops of platinum divinyltetramethyldisiloxane complex were added to the dissolved polymer solution. After 20 minutes heptamethyltrisiloxane (0.15 g, 0.83 mmol) was added and the reaction mixture was stirred at room temperature overnight. Dimethylethoxysilane (1 g, 9.6 mmol) was then added to the reaction mixture. The reaction mixture was stirred for 24 hours and the polymer was precipitated from chloroform into ethanol 3 times. An $^1$H NMR spectrum showed that the polymer 15 contained 33%, 38% and 29% of trifluoroethoxide, heptamethyltrisiloxane and dimethylethoxysilane derivatized groups, respectively.

Almost any organosilicon compound that contains an Si—H bond can be used to react with the polyphosphazenes of the present invention. These include linear siloxanes and silanes as well as cyclic species. Preferred organosilicon compounds include alkylsiloxanes and alkoxysilanes.

Cross-linking of Polymers:

The polymer films were prepared by solvent casting and were cross-linked either by UV irradiation or heating at 120° C. The progress of the crosslinking process was followed by swelling the cross-linked polymers in THF. Polymers 14 and 15 cross-linked without further treatment when films of these polymers were stored in the atmosphere overnight. These polymers were further cross-linked by warming at 80° C. for 1 hour. Polymers 9, 11, 12, and 13 were cross-linked by UV radiation. Thin films were prepared by solvent casting, and photolysis was carried out for 40 minutes with a Rayonet photochemical reactor. The temperature of the samples was maintained near 25° C. by a cooling fan. Thermal cross-linking of these polymers was attempted by heating the samples in a nitrogen atmosphere at 120° C. Samples heated longer than 5 minutes appeared to decompose. Therefore, thermal cross-linking of these polymers was not pursued.

Polymer 10 was irradiated for 1 hour under the same conditions described above, but the product was found to contain a significant amount of soluble polymer. To increase the crosslinking, 2 mole % of benzoyl peroxide was added to the polymer solution before the films were cast. The films containing benzoyl peroxide gave insoluble cross-linked polymer after being irradiated for 40 minutes.

Preparation of Interpenetrating Polymer Networks:

All the IPNs in this work were prepared by the method illustrated in the following example. Polymer 14 (0.2 g), which had been cross-linked by exposure to UV radiation, was placed in a solution containing 10 mL styrene, 0.05 g AIBN initiator, and 0.2 mL ethylene glycol dimethacrylate cross-linker. Polymer 14, the styrene, the initiator and cross-linker were combined at room temperature and maintained in the absence of light for 48 h or until the volume of the swollen polyphosphazene had increased 10 times. At this point, the reaction mixture was heated to 80° C. for 12 h. After cooling, the IPN was removed from the reaction mixture and was repeatedly extracted with THF and/or water to remove unpolymerized monomer and uncross-linked organic polymer. Following purification, the IPN was dried rigorously under vacuum and was characterized using $^1$H, $^{31}$P NMR, and FT-IR spectroscopy and DSC and TEM techniques.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A polyphosphazene comprising repeating units having the formula

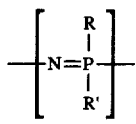

wherein R comprises the substituent group —OCH$_2$CH=CHCH$_3$ and R' comprises —OC$_6$H$_4$OCH$_2$C$_6$H$_5$.

2. A polyphosphazene comprising repeating units having the formula

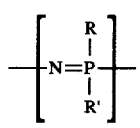

wherein R comprises the substituent group —OC$_6$H$_4$C$_6$H$_4$OCH$_2$CH=CH$_2$ and R' comprises —OC$_6$H$_4$OCH$_2$C$_6$H$_5$.

3. A polyphosphazene containing both —OCH$_2$CH=CHCH$_3$ and —OC$_6$H$_4$C$_6$H$_4$OCH$_2$CH=CH$_2$ substituent groups.

4. A polyphosphazene having the following formula

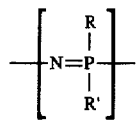

wherein R comprises the co-substituent groups —OCH$_2$CH=CHCH$_3$ and —OC$_6$H$_4$C$_6$H$_4$OCH$_2$CH=CH$_2$; and R' comprises a substituent group selected from the group consisting of —OCH$_2$CF$_3$, —OC$_6$H$_5$, and —OC$_6$H$_4$OCH$_2$C$_6$H$_5$.

5. A polymeric reaction product of a) a polyphosphazene containing one or more side groups selected from the group consisting of 2-butenoxy and 4-allyloxyphenylphenoxy; and b) an organosilicon compound.

6. A polymer according to claim 5 wherein the organosilicon is selected from the group consisting of alkoxysilanes and alkylsiloxanes.

7. A polymer according to claim 5 having the formula

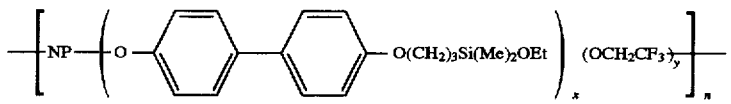

wherein n is from 300 to 100,000 and wherein x and y are >0 with the proviso that x+y=2.

8. A polymer according to claim 5 having the formula

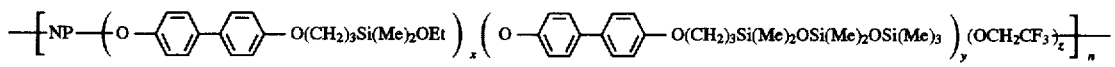

wherein n is from 300 to 100,000 and wherein x, y and z are >0 with the proviso that x+y+z=2.

9. An interpenetrating polymer network comprising an intimate mixture of a) a polyphosphazene containing one or more side groups selected from the group consisting of 2-butenoxy and 4-allyloxyphenylphenoxy; and b) a second polymer obtained from a monomer that has been polymerized within the crosslinked matrix of the polyphosphazene.

10. An interpenetrating polymer network according to claim 9 wherein the second polymer is either (i) made by addition polymerization of an unsaturated monomer, (ii) made by ring opening polymerization, or (iii) a condensation polymer.

11. An interpenetrating polymer network according to claim 9 wherein the second polymer is selected from the group consisting of polyacrylates, polymethacrylates, polyvinyl compounds, nylons, polylactones, polyformaldehyde, polylactic acids, polyglycolic acids, polyesters, polyacrylonitrile, polyacrylic acids, and polysiloxanes.

12. An interpenetrating polymer network comprising an intimate mixture of a) a polyphosphazene containing one or more side groups selected from the group consisting of 2-butenoxy and 4-allyloxyphenylphenoxy; and b) a polymer selected from the group consisting of

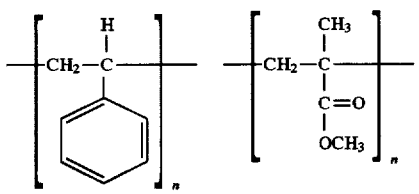

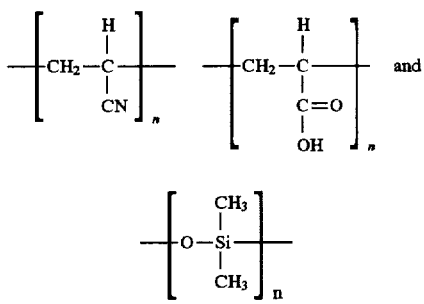

wherein n may vary from 100 to 100,000.

13. An interpenetrating polymer network according to claim 12 wherein the ratio of (a) to (b) ranges from 100:1 to 1:100.

14. An interpenetrating polymer network according to claim 12 wherein said polyphosphazene further comprises one or more side groups selected from the group consisting of trifluoroethoxy, benzyloxyphenoxy, and phenoxy groups.

* * * * *